United States Patent [19]

Wolf et al.

[11] 4,002,328

[45] Jan. 11, 1977

[54] VISE

[76] Inventors: Robert Wolf, Im Kiesacker, 5446 Engeln; Klaus Walter Moller, Karlstrasse 25, 7016 Gerlingen; Leo Klapperich, 5441 Weibern, all of Germany

[22] Filed: Oct. 6, 1975

[21] Appl. No.: 619,916

[30] Foreign Application Priority Data

| | | |
|---|---|---|
| Feb. 6, 1975 | Germany | 2504897 |
| Mar. 26, 1975 | Germany | 2513319 |
| July 10, 1975 | Germany | 2530776 |

[52] U.S. Cl. .................................. 269/97; 269/181; 269/243; 269/246

[51] Int. Cl.$^2$ .......................................... B23Q 3/02

[58] Field of Search .................. 269/45, 94, 95, 97, 269/99, 100, 172, 181, 182, 243, 246

[56] References Cited

UNITED STATES PATENTS

| | | | |
|---|---|---|---|
| 1,560,091 | 11/1925 | Nygren | 269/246 |
| 3,599,960 | 8/1971 | Phillips | 269/182 |
| 3,704,014 | 11/1972 | Keene | 269/172 |

FOREIGN PATENTS OR APPLICATIONS

| | | | |
|---|---|---|---|
| 835,876 | 4/1952 | Germany | 269/95 |
| 203,296 | 6/1939 | Switzerland | 269/45 |
| 363,307 | 6/1962 | Switzerland | 269/95 |

*Primary Examiner*—Al Lawrence Smith
*Assistant Examiner*—Robert C. Watson
*Attorney, Agent, or Firm*—A. A. Saffitz

[57] ABSTRACT

A vise is combined with a C clamp and the C clamp is fitted with at least 2 plug members fitting into receiving holes in the vise or in the C clamp, there being a larger number of holes than plug members whereby the C clamp, plugs and holes permit various orientations of the vise on a work bench.

9 Claims, 12 Drawing Figures

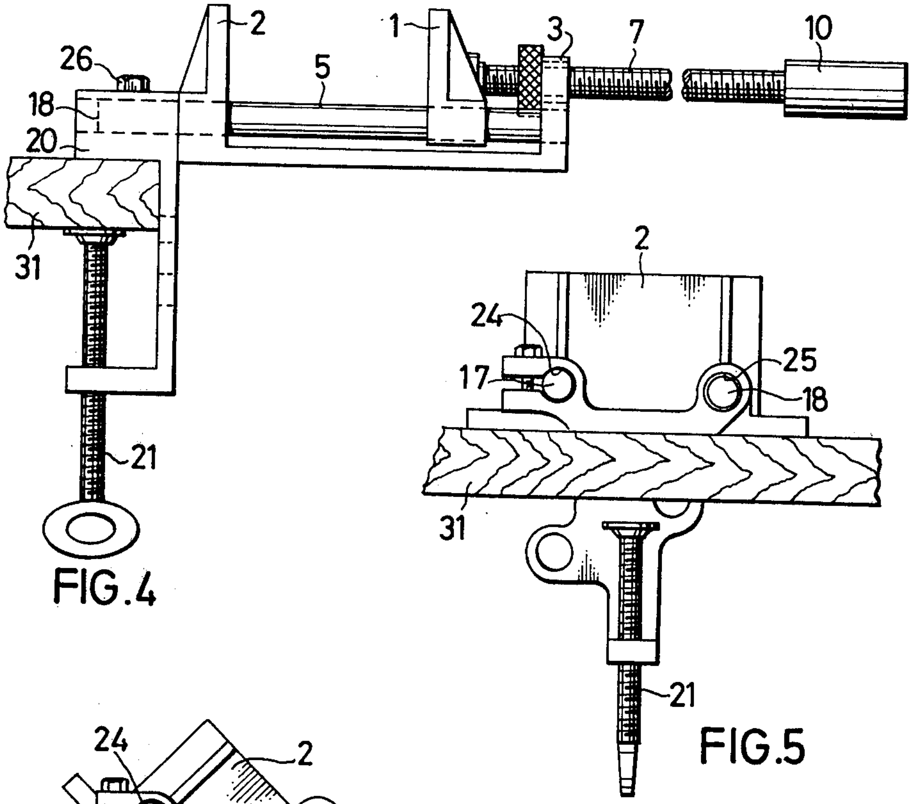
FIG.4
FIG.5
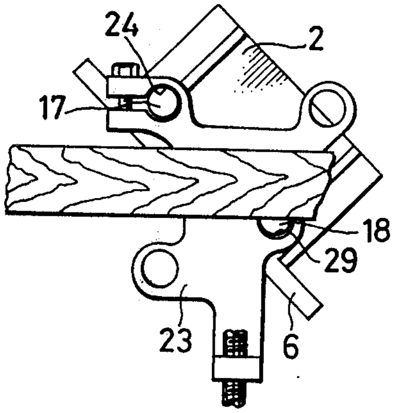
FIG.6
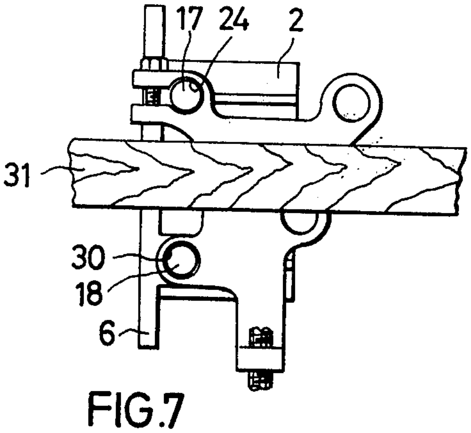
FIG.7

VISE

CROSS REFERENCE TO RELATED APPLICATIONS

Reference is made to West German Patent Applications P 25 04 897.9, filed Feb. 6, 1975, P 25 13 319.1, filed Mar. 26, 1975, and P 25 30 776.0, filed July 10, 1975 and priority under 35 U.S.C. 119 is claimed for these West German Patent Applications.

BACKGROUND OF THE INVENTION a. Field of the Invention

The invention relates to a vise, which is equipped with an arrangement for screwing it onto a work bench or the like.

b. Description of the Prior Art

In case of the known vises, the attaching arrangements which are available for home or do-it-yourself use are designed only for a special type of attachment. Thus in case of a very widely used type of vise a screw attachment is provided, with which the vise while resting on a work bench is screwed on to an edge of the bench and whereby the receiving space between the jaws of the vise is oriented perpendicularly in relation to the surface of the work bench.

Furthermore, other vises are known in which the base plate of the vise is provided with holes for the insertion of attaching screws and with which the vise can be attached to the bottom or the receiving plate for the work piece of a drill stand for a "do-it-yourself" drilling machine. The limited utilization of the known vises, however, is of particular disadvantage for amateur craftsman, since the acquisition of several vises is not worthwhile in view of only occasional use. Beyond that, however, the work done by non-professionals, such as drilling, milling, sawing, mitering, etc., is so diverse and the forms and dimensions of the work pieces to be processed are so dissimilar, that the work pieces can often not be positioned properly with one vise, which can only be attached in one single position to the work bench.

OBJECTS OF THE INVENTION

The invention is based on the objective of creating a vise attachment intended predominantly for the do-it-yourself market, which can be attached in variable positions to a work bench, and can be used more universally than present vise attachments.

A further object of the invention is to provide a C clamp and two plug attachments for a vise in which each of the plugs is adapted to fit into a receiving hole made either in the vise or in the C clamp to thereby permit various positions to be fixed in attaching the vise to a work bench.

A further object is to provide a means for holding a vise in various positions, each securely fixed by the vise attachment to permit different kinds of operations on work held in the vise.

Other and further objects will become apparent from the following specification and description of the drawings.

SUMMARY OF THE INVENTION

Starting out from a conventional vise of the above described type, this object will be achieved according to the invention, by combining a separate C clamp to the vise and by arranging at least two plug members on the vise or on the C clamp and by always arranging a larger number of corresponding receiving holes on the other part to receive these members and thereby making it possible that the vise can be changed into various insertion positions in relation to said C clamp.

Preferably, the invention provides for two plug members, hereinafter called plugs, in parallel to the guide bars, to be attached to the outside of the fixed jaw, to which plugs a U-shaped C clamp has been combined for attachment to a work bench or the like, the clamping arm of which, reaching over the work bench, has two receiving holes for the plugs so that said arm of the clamp is provided with an arrangement for clamping down at least one of the plugs and that additional receiving holes are disposed in the base jaw of the C clamp, which are distributed over a sector, preferably of 90° the sector curves receiving hole for the plug which is equipped with a clamping device, in the upper C clamp jaw.

Accordingly to one kind of attachment, the vise of the invention is attached to the clamp, screwed on to the work bench and projects freely from the edge of the bench into the room, whereby the vise can be attached in variable sloping positions, always depending on the selected pair of receiving holes for the plugs, and for example the receiving space between the jaws can also be aligned laterally or horizontally. Thus, for example, a long strip can either be fixed perpendicularly in the vise attached to the work bench, or else, the vise can be arranged in a proper slanting position on the work bench for a miter cut and the work bench can be clamped perfectly in said slanting position.

In a further embodiment of the invention, the underside of the base plate of the vise is aligned with the supporting surface of the bench of the upper jaw of the clamp and that the receiving holes for the plugs are formed as through-bores. As a result of this measure, the possibility exists at the same time of fixing the vise with the use of the same attaching means in the customary manner resting on the work bench.

According to a preferred and further embodiment of the invention, the base of the vise is provided with widened portions projecting beyond the guide bars, in which longitudinal grooves are recessed on the clamping bench of a drill stand for attaching the vise. After separation of the C clamp, the vise thus can also be used in connection with a drill stand, so that a universal and useable vise for the do-it-yourself market has been created.

In another embodiment of the invention, the attaching plugs of the vise can consist of extensions of the guide bars and a plug-receiving hole can be formed in the jaw of the C clamp by two jaws that can be clamped together by a screw. Such a vise is cheaply produced and very easy to handle.

In order to adapt the vise still further to the needs of do-it-yourselfer's and in order to make possible quick working, the vise is provided with an arrangement for quick adjustment of the distance of the jaws. In this case, provision can be made according to an embodiment that the movable jaw is adjustable by means of a spindle in relation to the fixed jaw along guide bars, which are rigidly attached to the fixed jaw and to a spindle abutment (support) block, penetrated by the spindle, that the diameter of the hole of the spindle bearing block, receiving the spindle is larger than the diameter of the spindle and that an easily running nut is arranged on the spindle between the movable jaw and the abutment block, the diameter of which is larger than the diameter of the hole of the spindled bearing block. Because of this measurement, the spindle is freely shiftable in axial direction in the spindle bearing block, so that the movable jaw can be shifted quickly into always the required position without turning of the spindle. Should in case of an enlargement of the distance between the jaws, the nut strike and spindle abutment block prematurely, then the latter can quickly be moved in the direction of the movable jaw. After the workpiece that is to be clamped down, is trapped between the jaws by moving the movable jaw up, the easily running nut is adjusted until striking the abutment block, where it fits with such a frictional or positive contact, that the nut itself does not participate in the rotation during the subsequent rotation of the spindle, but that it now represents the guide of the spindle thread during the actual clamping down of the workpiece as a result of the rotation of the spindle. Thus, the vise according to the invention has been provided with an easily operable quick adjustment.

In another embodiment of the invention, the nut or the abutment block can be roughened to the front sides facing each other, as a result of which it will be assured to a higher degree, that the nut fitting on the abutment block does not take part in the rotation which might be expected during the actual clamping down process.

Effectively, the nut is knurled on its peripheral surface and is made particularly easy to drip in this manner or in similar manner, so that it can be put into quick rotation by a finger passing tangentially and quickly by its peripheral surface, so that it will quickly carry out its required adjusting path in an axial direction.

According to an alternative, preferred embodiment, provision can be made for the guide thread for the spindle to be attached to a separate part of the abutment and disposed movably on a spindle abutment block and so that it can be moved out of the spindle thread by means of a handle. At the same time the abutment part is advantageously loaded by a spring in the direction of a thread engagement with the spindle, so that it can be moved out of the spindle thread by means of a handle. At the same time the abutment part is advantageously loaded by a spring in the direction of a thread engagement with the spindle, so that in the basic position of the vise, the adjustment of the distance of the jaws takes place in the customary manner by simply turning the spindle. For a quick adjustment, the abutment part is uncoupled from the spindle by means of the handle of the abutment part, or of its spindle guiding thread, after which the spindle is freely shiftable in an axial direction and consequently the movable jaw can be shifted quickly always into the desired position without turnng of the spindle. After releasing the handle, the guide thread of the spindle again engages with the spindle thread under the effect of the return spring, so that the last, tight clamping down of the work piece can again be accomplished in the customary manner by turning of the spindle.

In a special embodiment of the invention, the abutment part consists of a pestle, which is oriented perpendicularly in relation to the spindle and is shiftable counter to the force of a return spring, but twists resistingly in an abutment block and in which the pestle has a section provided with the spindle guide thread and immediately above the latter a recess, which, when the pestle is depressed, accommodates said spindle free of contact. The position of the pestle is fixed in the depressed position by limiting stops. This embodiment is distinguished by a very easy way of handling, since it is merely necessary for a quick adjustment to depress the pestle with one hand, whereupon then the spindle can be shifted freely in axial direction with the other hand.

BRIEF DESCRIPTION OF THE DRAWINGS

The vise of the invention will be described in more detail on the following pages on the basis of two embodiments by way of example shown in the drawings.

FIG. 4 shows the vise in sideview, attached to the work bench according to a further method of attachment;

FIG. 5 shows the vise in FIG. 4, viewed from the left;

FIG. 6 shows the vise in a direction of view analogous to FIG. 5 in a position of attachment slanted by 45°;

FIG. 7 shows the vise in a position inclined by 90°;

DESCRIPTION OF THE PREFERRED EMBODIMENTS

Figure 1:
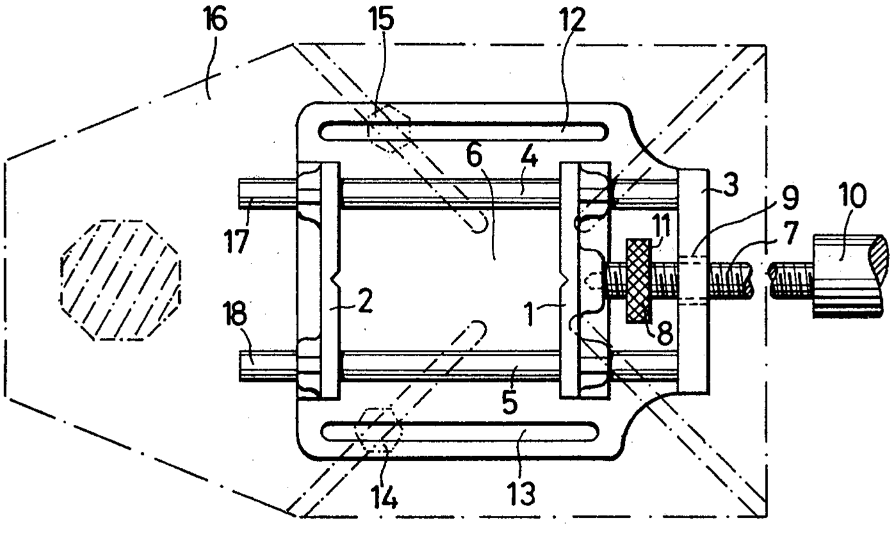
FIG. 1 shows a vise in top view according to the invention in connection with the base plate or the clamping table of a drill stand.

The vise in FIG. 1, consists of a movable jaw 1, a fixed jaw 2, an abutment block 3 and of two parallel guide bars 4 and 5 for the movable jaw 1. The guide bars 4 and 5 are connected rigidly with the fixed jaw 2 and the abutment block 3, which on their part are attached rigidly on the base plate 6 of the vise or are cast in one piece with the latter. The vise has a spindle 7, penetrating the abutment block 3 with clearance, the operating end of which is contained and fixed on to the movable jaw 1 and which carries a threaded nut 8 on its section between the movable jaw 1 and the abutment block 3.

The diameter of the hole 9 of the abutment block 3, receiving the spindle 7, is larger than the diameter of said spindle, so that, in case of the position of the nut 8, shown in FIG. 1, the spindle 7 can be shifted freely in an axial direction right through the hole 9. The spindle 7, on its outside, free end, has been provided with a rotary nob as a handle 10, both for rotating as well as for axial shifting.

The nut 8 has been provided on its peripheral surface with a handy knurling, and on its front surface 11 facing the abutment block 3, with a roughening. The movable jaw 1 is shifted by way of the handle 10 until enclosing a work piece between the jaws 1 and 2, after which the nut 8 is rotated "free wheeling" quickly until fitting against the abutment block 3. Subsequently, the spindle 7 is rotated on the handle 10. Since now the nut 8, fitting with its roughened front surface 11 against the abutment block 3, does in this case not participate in the rotation, the nut now constitutes the abutment of the spindle, so that the final clamping down or chucking of the work piece between the two jaws can now be accomplished by rotating of the spindle 7. The vise thus can be adjusted quickly to the pertinent clamping position in case of work pieces of greatly variable sizes.

The base plate 6 has been provided always with a broadening (bulge) on both sides of the guide bars 4 and 5, in which longitudinal grooves 12 and 13 have been recessed, which serve for the reception of attaching screws 14 and 15, by means of which the vise can be clamped down firmly on the base plate or table or bench 14 of a drill stand for a home-use drilling machine.

As is clear from FIG. 1, the guide bars 4 and 5 penetrate the fixed jaw 2 and form two plugs 17 and 18 projecting on the outside of the fixed jaw.

Figure 2:
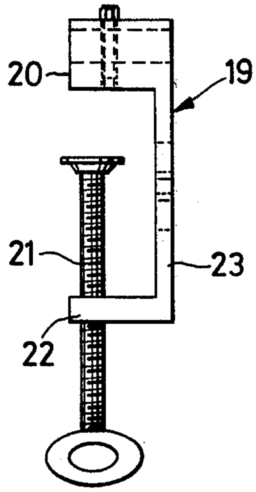
FIG. 2 is a side view of the C clamp, assigned to the vise, for attachment to a work bench, etc.
Figure 3:
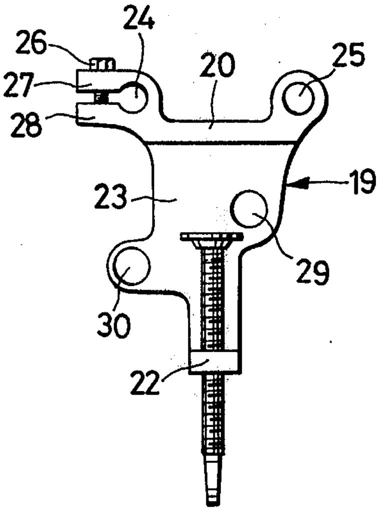
FIG. 3 shows the C clamp in FIG. 2, viewed from the left.

The C clamp 19 shown in FIGS. 2 and 3, is combined with the vise according to FIG. 1, said C clamp making possible the attachment of the vise to the work bench in various positions. The C clamp has a U-shaped basic body which consists of a clamp arm 20, engaging over the work bench, an arm 22 guiding the screw 21 of the clamp, and a basic jaw 23. In the upper arm 20 of the clamp, two continuous, parallel receiving holes 24 and 25 have been provided, into which the vise can be inserted with its plugs 17 and 18. The receiving hole 24 is formed by two jaws 27 and 28 which can be clamped together by a cap screw (set screw) 26, and with which the inserted plug 17 or 18 can be tightened on the C clamp 19. Still more receiving holes 29 and 30 for plugs have been provided in the basic jaw 23 of the C clamp, which together with the receiving hole 25 are distributed over a circular arc of 90°, drawn around the receiving hole 24 for the plugs, equipped with a plug tightening arrangement.

FIGS. 4 and 5 show the vise attached to a work bench 31 using the C clamp 19, which vise projects away from the edge of the work bench, into the room. The pin 17 has been plugged into the receiving hole 24 and the pin 18 into the receiving hole 25, and the vise here is oriented horizontally.

In case of the method of attachment illustrated in FIG. 6, the pin 17 again is plugged into the receiving hole 24 equipped with the clamping down arrangement, while the pin 18 is plugged into the middle receiving hole 29 provided in the basic jaw 23, so that the vise respectively its base plate 6 now is inclined by 45° vis a vis the horizontal plane.

In FIG. 6, the pin 18 is plugged into the receiving hole 30 of the basic jaw 23 of the C clamp lying perpendicularly under the receiving hole 24, so that the vise, respectively its base plate 6 now is oriented perpendicularly in relation to the work bench 31.

If additional receiving holes, lying between the holes 30, 29 and 25 are provided in the basic jaw 32, then the vise can be clamped down in an even finer angular gradation on the work bench 31.

Figure 8:
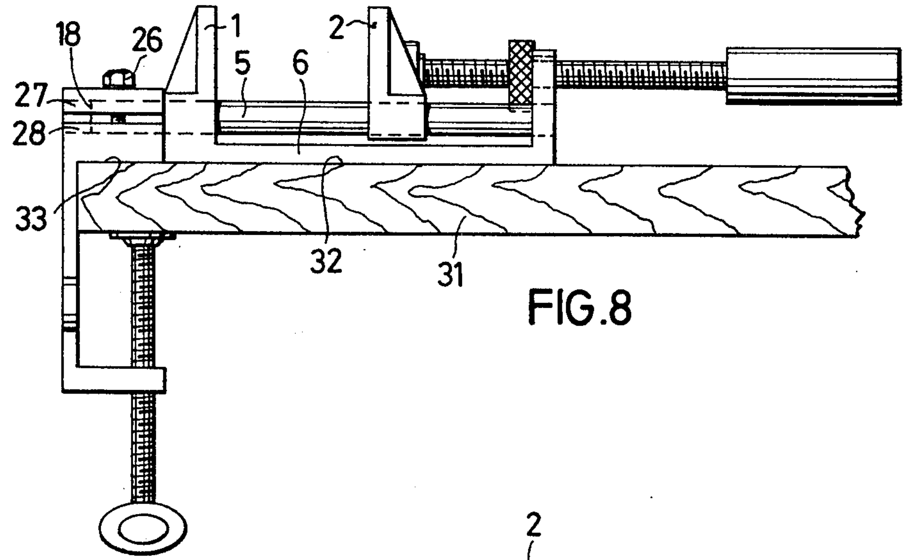
FIG. 8 shows the vise in side view in a position of mounting in wich it rests on the work bench.
Figure 9:
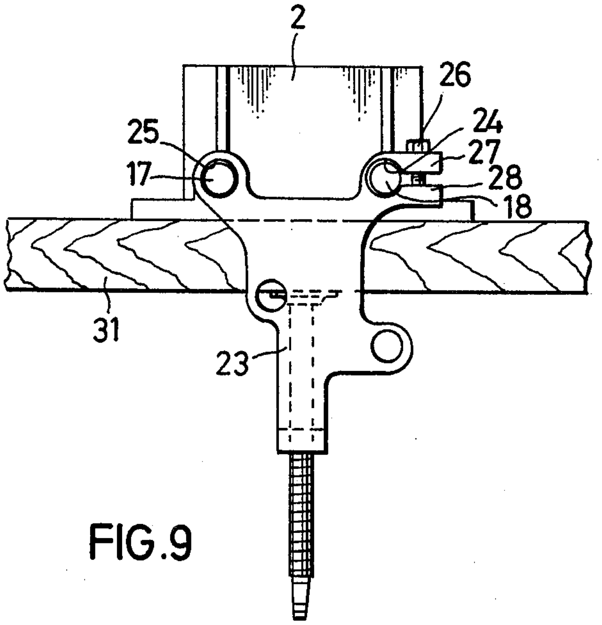
FIG. 9 shows the vise in FIG. 8, viewed from the left.

While in the case of the methods of attachment as in FIGS. 4 to 7, the vise projects freely into the room, the FIGS. 8 and 9 show a method of attachment, in case of which the vise rests with its base plate 6 on the work bench 31. For this purpose both the vise and the C clamp are synchronized in such a way that the underside 32 of the base plate 6 of the vise and the bench bearing surface 33 of the upper clamp arm are aligned with one another. The pins 17 and 18 of the vise in this case are plugged into the receiving holes 24 and 25, developed as through bores from the direction in comparison to the FIGS. 4 and 5 of the opposite side, whereby now the pin 18 is accommodated by the receiving hole 24, equipped with the clamping down arrangement as shown in parts 26, 27 and 28.

Figure 10:
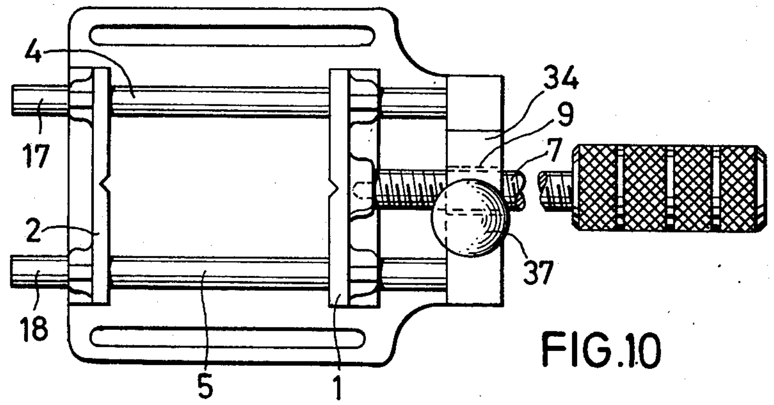
FIG. 10 shows a modified embodiment of the vise according to the invention in top view.
Figure 11:
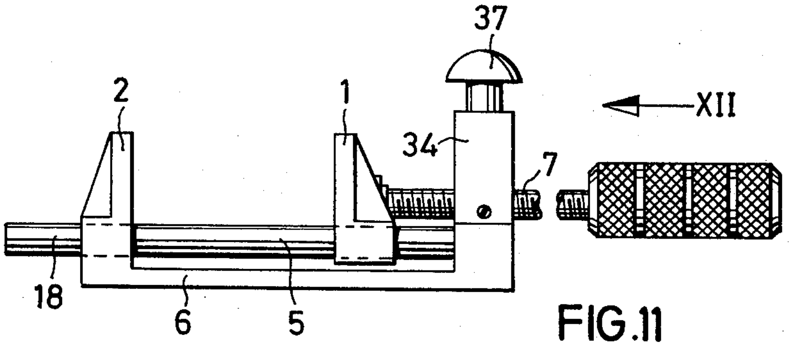
FIG. 11 shows the vise of FIG. 10 in side view.
Figure 12:
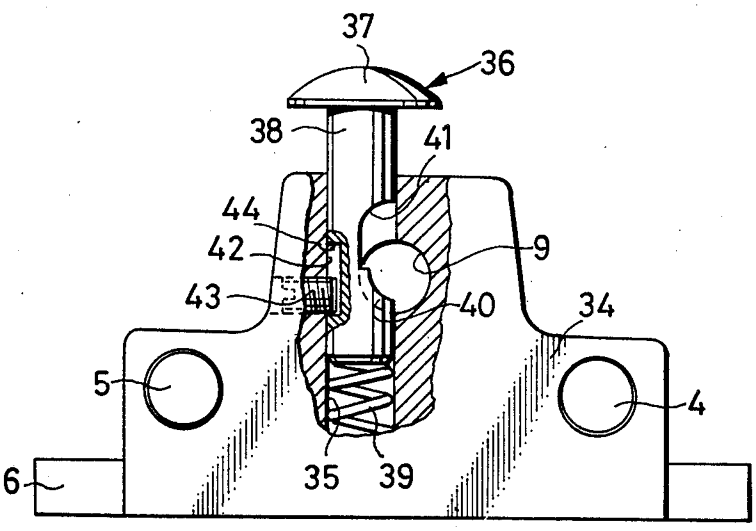
FIG. 12 shows the vise in elevation according to the direction of view XII in FIG. 11, but without spindle.

The FIGS. 10 to 12 show a further embodiment of the vise which has been modified merely in regard to the arrangement for the rapid adjustment of the movable jaw 1 vis a vis the previously described embodiment. The same number of references have been used for the same parts as in FIGS. 1 and 4.

A separate abutment part 36 is mounted in the abutment block 34 (cf. especially FIG. 12) within a blind bore 35. The blind bore 35 is oriented perpendicularly in relation to the spindle 7 and bisects a half of the spindle receiving hole 9 in the abutment block 34. The abutment part 36 consists in case of the embodiment, given by way of example, of a pestle 38 provided with a handle 37, the shaft of which is guided axially shiftably in the blind bore 35 and can be depressed counter to the force of a return spring 39 disposed on the bottom of the blind bore. On the side facing the spindle, respectively, the hole 9, the shaft of the pestle 38 has a section equipped with, a spindle guide thread 40, and directly above it a part cylindrical recess 41, which, whenever the pestle is depressed, is aligned with the hole 9 of the abutment block 34.

In the position shown in FIG. 12, the return spring 39 forces and presses the guide thread 40 of the pestle into engagement with the spindle, penetrating the hole 9, so that the movable jaw 1 can be adjusted by turning of the spindle 7. During depressing of the pestle, the section of the thread 40 is forced out of the thread of the spindle 7, and the spindle is accommodated and received free of clearance by the recess 41, so that the spindle now can be pushed freely axially right through the abutment block 34 and a quick adjustment of the movable jaw 1 can be accomplished. The depressed position of the pestle is assured by a screw 43, projecting into an axial groove 42 of the pestle 38, against which (screw) the upper terminal surface 44 of the groove 42 abuts during depression of the pestle. The screw 43, engaging with the groove 42, at the same time protects the pestle against twisting.

What is claimed is:

1. A vise in combination with a C clamp for attaching the vise to a work bench in various positions, said vise comprising:

a movable jaw;

a spindle to move said movable jaw;

a quick release mechanism to provide coarse adjustment of said spindle and said movable jaw;

a base plate with a fixed jaw and with a fixed abutment block, which is penetrated by said spindle, and two parallel guide bars for said movable jaw extending between said fixed jaw and said abutment block, said bars penetrating said fixed jaw and extending to form two plugs projecting at the outside of said fixed jaw; said C clamp having clamping screw means for clamping a work bench or the like and a basic body which is provided with a first receiving hole to receive one of said plugs and further provided with at least three further holes extending parallel to the first hole and distributed over a circular arc spaced apart at 90° with respect to said first hole as a center and adapted to receive alternatively the other of said plugs and said first center hole used for all positions being provided with a further clamping means to clamp the inserted plug in any of its diametral directions.

2. A vise in combination with a C clamp for attaching the vise to a work bench in various positions, said vise comprising:

a movable jaw;

a spindle to move said movable jaw;

a base plate with a fixed jaw and with a fixed abutment block which is penetrated by said spindle, and two parallel guide bars for said movable jaw extending between said fixed jaw and said abutment block, said bars penetrating said fixed jaw and extending to form two plugs projecting at the outside of said fixed jaw; said C clamp having a clamp screw for clamping a workbench or the like and a basic body, which consists essentially of:

a clamp arm engageable over the work bench;

a guiding arm extending parallel to said clamp arm for guiding said clamp screw, and a basic jaw plate connecting said clamp arm and guiding arm; said clamp arm being provided with two parallelly aligned receiving holes spaced at a distance and in a size to allow the insertion of said two plugs of the vise, one of the receiving holes being formed by two jaws which can be clamped together by a set screw, and the basic jaw plate being provided with at least two further holes distributed over a circular arc drawn around that center receiving hole which is formed by the said two jaws, the further holes being parallel to the two receiving holes and being at a distance from said center hole equal to the distance between the two plugs so that the further holes can alternatively receive that plug which is not inserted in the center hole.

3. The combination as claimed in claim 1 wherein the underside of the base plate of the vise is aligned with the contact surface of the work bench and also with the upper clamp arm and wherein the receiving holes for the plugs are through-bores.

4. The combination as claimed in claim 1 wherein the base plate of the vise is provided with widened portions projecting laterally beyond the guide bars and in which longitudinal grooves have been recessed for the attachment of the vise on the clamping table of a drill stand.

5. The combination as claimed in claim 1 wherein said movable jaw is adjustable in relation to the fixed jaw along guide bars by means of a spindle and said bars are rigidly attached to an abutment block for the spindle, penetrated by said spindle, the diameter of the hole of the abutment block of the spindle which receives the spindle being larger than the diameter of the spindle, a nut being disposed on the spindle between the movable jaw and the abutment block in which the outside diameter is larger than the diameter of the hole of the abutment block of the spindle and said nut and said abutment block being roughened on their front sides facing each other.

6. The combination as claimed in claim 1 wherein said movable jaw is adjustable along guide bars relative to the fixed jaw by means of a spindle and said bars are attached rigidly to the fixed jaw and to an abutment, penetrated by the spindle, and having a spindle guide thread, the spindle guide thread being attached to a separate abutment part, disposed movably on an abutment block for the spindle, and being movable out of the thread of the spindle by means of a handle.

7. The combination as claimed in claim 6 wherein said abutment part is loaded with a spring in the direction of a thread engagement with said spindle.

8. The combination as claimed in claim 7 wherein said abutment part consists of a pestle mounted shiftably counter to the force of a return spring, but resists rotation and is not rotatable in the abutment block and is oriented perpendicularly in relation to the spindle, said pestle on its shaft side facing the spindle having a section equipped with the guide thread for the spindle and immediately above this section has a recess which, in case of the depressed pestle, accommodates the spindle free of contact.

9. A vise as claimed in claim 8 wherein limiting stops are provided for fixing of the pestle position in the depressed position.

* * * * *

UNITED STATES PATENT OFFICE
CERTIFICATE OF CORRECTION

PATENT NO. : 4,002,328

DATED : January 11, 1977

INVENTOR(S) : ROBERT WOLFF, KLAUS WALTER MOELLER AND LEO KLAPPERICH

It is certified that error appears in the above-identified patent and that said Letters Patent are hereby corrected as shown below:

correct the spelling of the first inventor's name to: --ROBERT WOLFF--.

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*